UNITED STATES PATENT OFFICE.

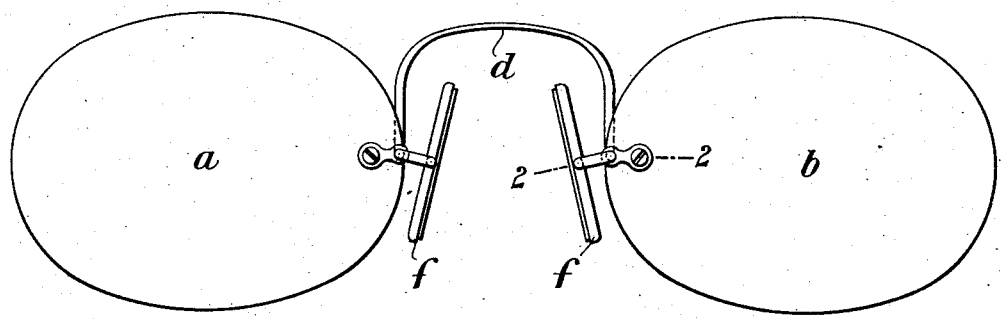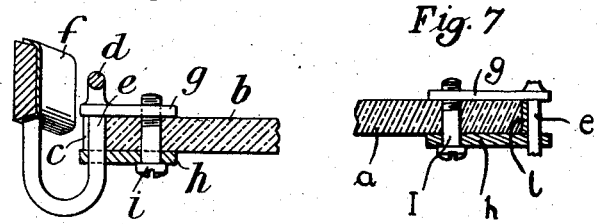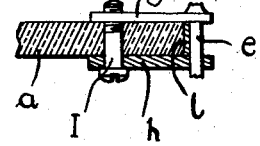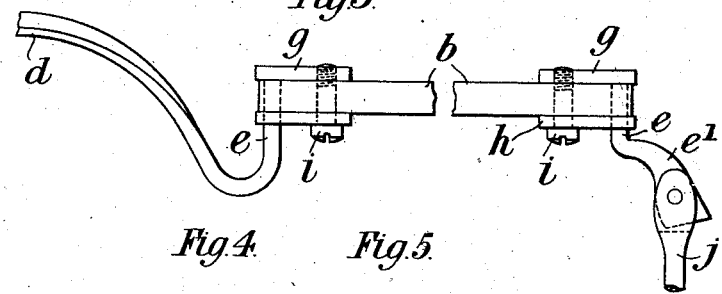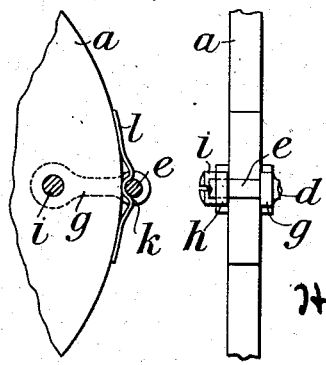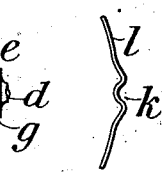

HARRY NEWBOLD, OF LONDON, ENGLAND.

SPECTACLES, EYEGLASSES, AND THE LIKE.

997,317.  Specification of Letters Patent. Patented July 11, 1911.

Application filed December 16, 1909. Serial No. 533,426.

*To all whom it may concern:*

Be it known that I, HARRY NEWBOLD, a subject of the King of Great Britain, residing at 46 and 48 Goswell road, London, England, have invented certain new and useful Improvements in Spectacles, Eyeglasses, and the Like, of which the following is a specification.

My invention relates to spectacles, eyeglasses and the like, of the kind having rimless lenses which are attached to their mounts by means of stirrups upon the latter which embrace the lenses and are secured thereto by screws. As heretofore made the legs of these stirrups are generally rigid relatively to one another, so that a fitting adapted for a lens of one thickness cannot be applied to a lens of a different thickness.

Now, the object of this invention is to provide means whereby the mounts can be adapted to lenses of different thickness, and to this end the invention consists essentially in making one leg of each stirrup adjustable relatively to the other leg, so as to permit of varying the distance between the legs. This loose leg is designed to slide at one end upon a wire or pin attached to the end, or forming part of the stirrup and at the other end, to be secured by means of a screw which passes through the lens into the other leg of the stirrup in the usual manner. When applied to the bridge of spectacles or eyeglasses, this wire or pin may form an extension of the bridge, while in the case of the connection of the temples of spectacles to the lenses it may be curled to form an eye to which the side-arm may be attached.

To enable the invention to be fully understood I will describe it by reference to the accompanying drawing, in which:—

Figure 1 is an elevation drawn to an exaggerated scale of eyeglasses having the improvements applied thereto, and Fig. 2 is a section on the line 2—2, Fig. 1, drawn to a larger scale. Fig. 3 is a plan of a portion of a pair of spectacles provided with the improvements. Fig. 4 is a sectional side view illustrating a modification. Fig. 5 is a view at right angles to Fig. 4, and Fig. 6 is a view of a detail hereinafter described. Fig. 7 is a view similar to Fig. 2, showing a modification of Figs. 1 and 2.

*a* and *b* are the two lenses of eyeglasses each of which is formed with a notch *c* as shown in Fig. 2.

*d* is the bridge of the mount, the two lower extremities of the said bridge being bent at right angles so as to form the pins *e* and then being curved backward so as to form the points of attachment of the guards *f*.

*g* and *h* are the two legs of the stirrup, the leg *g* being permanently fixed to the portion or pin *e* of the mount which enters the notch *c* in the lens and the leg *h* being loosely mounted thereon in such a manner that it can be adjusted relatively to the fixed leg *g*, thereby permitting the same mount to be attached to lenses of different thickness. When the lens is in position between the legs *g* and *h* of the stirrup the said two legs are clamped in position by means of the screw *i* which passes through the lens and the two legs in the usual manner.

As above stated, when the invention is applied to the connection of the temples of spectacles to the lenses thereof, the pin *e* on which the loose leg *h* of the stirrup is adjustable may be bent as shown at *e'*, Fig. 3, and formed with an eye for the attachment of the temple *j*.

In the modification illustrated in Figs. 4, 5 and 6 the lenses *a* and *b* are made plain, that is to say, without notches *c* and the pin *e* of the stirrup engages the transverse groove or recess *k* formed transversely in a spring plate *l* which is shown detached in Fig. 6 and which is placed between the said pin *e* and the periphery of the lens. The extremities or ends of this spring plate *l*, when the fitting is applied to the lenses, press upon the periphery of the latter with sufficient force to prevent relative movement taking place between the stirrup and lens.

Claims.

1. In spectacles, eyeglasses, and the like, the combination with the lenses of a mount, comprising a bridge, transverse pins forming extensions of said bridge and stirrups consisting of two legs, one rigidly attached to the transverse pin and the other being loosely mounted thereon, each of said lenses having a part provided with a recess adapted to be engaged by said transverse pin.

2. In spectacles, eyeglasses, and the like the combination with the lenses of a mount, comprising a bridge, a transverse pin integral therewith, stirrups, consisting of two legs, one rigidly attached to the transverse pin and the other being loosely mounted thereon, each of said lenses having a part provided with a recess adapted to be engaged by said transverse pin, the said transverse pins being bent back and guards secured thereto.

3. In spectacles, eyeglasses, and the like the combination with the lenses, of a mount having stirrups comprising transverse pins, each carrying a fixed arm and an arm adjustable thereon, and a spring plate, engaging the periphery of the lens and being provided with a recess to engage the transverse pin.

4. In spectacles, eyeglasses and the like, the combination with the lenses of a mount having stirrups comprising transverse pins, each carrying a fixed arm and an arm adjustable thereon, each of said lenses having a part provided with a recess adapted to be engaged by said transverse pins.

HARRY NEWBOLD.

Witnesses:
JOHN E. BONSFIELD,
C. G. REDFERN.

Copies of this patent may be obtained for five cents each, by addressing the "Commissioner of Patents, Washington, D. C."